(12) United States Patent
Mimura et al.

(10) Patent No.: US 8,099,478 B2
(45) Date of Patent: Jan. 17, 2012

(54) PROGRAM, METHOD, AND APPARATUS FOR MANAGING APPLICATIONS

(75) Inventors: Toshihiro Mimura, Kawasaki (JP); Hideki Nozaki, Kawasaki (JP); Shuichi Chiba, Kawasaki (JP); Hideo Hayakawa, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 881 days.

(21) Appl. No.: 11/788,150

(22) Filed: Apr. 18, 2007

(65) Prior Publication Data

US 2007/0192769 A1    Aug. 16, 2007

Related U.S. Application Data

(63) Continuation of application No. PCT/JP2004/15525, filed on Oct. 20, 2004.

(51) Int. Cl.
  G06F 15/177    (2006.01)
  G06F 15/173    (2006.01)
(52) U.S. Cl. ........................ 709/220; 709/243
(58) Field of Classification Search .................. 709/220, 709/243
  See application file for complete search history.

(56) References Cited

U.S. PATENT DOCUMENTS

| | | | |
|---|---|---|---|
| 5,835,911 A | 11/1998 | Nakagawa et al. | |
| 6,779,016 B1 | 8/2004 | Aziz et al. | |
| 7,406,484 B1 * | 7/2008 | Srinivasan et al. | 707/200 |
| 7,437,723 B1 | 10/2008 | Kihara et al. | |
| 2001/0039548 A1 * | 11/2001 | Shinkai et al. | 707/201 |
| 2002/0133536 A1 * | 9/2002 | Ramachandran | 709/201 |
| 2003/0099238 A1 * | 5/2003 | Payne et al. | 370/394 |
| 2005/0021759 A1 * | 1/2005 | Gupta et al. | 709/226 |
| 2005/0193115 A1 * | 9/2005 | Chellis et al. | 709/226 |
| 2008/0216098 A1 * | 9/2008 | Agarwal et al. | 719/328 |

FOREIGN PATENT DOCUMENTS

| | | |
|---|---|---|
| EP | 1 079 301 | 2/2001 |
| EP | 1 206 738 | 4/2004 |
| JP | 03-238529 | 10/1991 |
| JP | 6-274321 | 9/1994 |
| JP | 07-225723 | 8/1995 |
| JP | 07-225723 A | 8/1995 |
| JP | 2001-067225 | 3/2001 |
| JP | 2001-175460 | 6/2001 |
| JP | 2002-163241 | 6/2002 |

(Continued)

OTHER PUBLICATIONS

"Japanese Office Action", mailed by JPO and corresponding to Japanese application No. 2006-542137 on Jul. 6, 2010, with partial English translation.

(Continued)

*Primary Examiner* — Patrice Winder
*Assistant Examiner* — Ebrahim Golabbakhsh
(74) *Attorney, Agent, or Firm* — Fujitsu Patent Center

(57) ABSTRACT

A program for managing applications that can replace application resources deployed over a multi-layered system with a single action. Upon receipt of a request for establishing an environment for a service, a target platform determining means consults group management data to identify server computers belonging to server groups corresponding to a plurality of functions necessary to provide the requested service. The identified server computers are chosen as target platforms on which necessary applications will be deployed to implement the functions. An application deploying means successively selects deployment data of applications required to implement the functions for the requested service and deploys each selected deployment data to the server computers chosen as the target platforms.

7 Claims, 22 Drawing Sheets

FOREIGN PATENT DOCUMENTS

| | | |
|---|---|---|
| JP | 2002-163241 A | 6/2002 |
| JP | 2003-507817 | 2/2003 |
| JP | 2003-507817 A | 2/2003 |
| JP | 2004-178290 | 6/2004 |
| WO | WO 01/14987 | 3/2001 |

OTHER PUBLICATIONS

"Japanese Official Action", mailed by JPO and corresponding to Japanese application No. 2006-542137 on Feb. 1, 2011, with partial English translation.

* cited by examiner

FIG. 10

113 STATUS DATA SET

HashMap001    113a

| OPERATION | STATUS | MESSAGE | DETAILS |
|---|---|---|---|
| CREATE | SUCCESSFUL | Successfully deployed | - |
| UPDATE | - | - | - |
| DELETE | - | - | - |

HashMap002    113b

| OPERATION | STATUS | MESSAGE | DETAILS |
|---|---|---|---|
| CREATE | FAILED | Deployment failed | Due to lack of privilege |
| UPDATE | - | - | - |
| DELETE | - | - | - |

HashMap003    113c

| OPERATION | STATUS | MESSAGE | DETAILS |
|---|---|---|---|
| CREATE | SUCCESSFUL | Successfully deployed | - |
| UPDATE | - | - | - |
| DELETE | - | - | - |

⋮

116   SERVER GROUP MANAGEMENT TABLE

| SERVER GROUP NAME | SERVER LIST |
|---|---|
| SERVER GROUP M | ServerList001 |
| SERVER GROUP N | ServerList002 |
| SERVER GROUP O | ServerList003 |
| SERVER GROUP P | ServerList004 |
| SERVER GROUP Q | ServerList005 |
| SERVER GROUP R | ServerList006 |
| SERVER GROUP X | ServerList007 |
| SERVER GROUP Y | ServerList008 |
| SERVER GROUP Z | ServerList009 |

FIG. 18

| NEW | | |
|---|---|---|
| CREATE NEW SERVICE | | |
| SERVICE NAME | WU001 | |
| SERVICE TYPE | ● J2EE  ○ CORBA | |
| DEPLOYMENT TYPE | ○ 1VM<br>● Individual VM<br>○ Web Only<br>○ EJB Only | |
| TARGET | Web server connector | ServerGrp001 ▼ |
| | Servlet Container | ServerGrp002 ▼<br><br>| No. | Server Name | IP address of Business LAN |<br>|---|---|---|<br>| 1 | Server A | 10.123.112.33 ▼ |<br>| 2 | Server B | 10.123.112.43 ▼ |<br>| 3 | Server C | 10.123.112.53 ▼ | |
| | EJB Container | ServerGrp003 ▼ |
| INTER-SERVER RELATION | ○ Mesh  ● Line | |
| CREATE | | |

40, 41, 42, 43, 44, 45, 46

PROGRAM, METHOD, AND APPARATUS FOR MANAGING APPLICATIONS

This application is a continuing application, filed under 35 U.S.C. §111(a), of International Application PCT/JP2004/015525, filed Oct. 20, 2004.

BACKGROUND OF THE INVENTION

1. Field of the Invention

The present invention relates to a program, method, and apparatus for managing applications in remote servers, and more particularly to an application management program, method, and apparatus for remotely manipulating deployment of applications.

2. Description of the Related Art

Some server-based services require two or more server applications to work in a cooperative manner. For example, some services are provided through collaboration between web service functions, application service functions, and database service functions.

This description uses the following notation: A specific function name followed by the term "server" refers to a service function provided by application software programs running on a computer platform. The term "server computer," on the other hand, refers to a computer that executes application software programs to provide services.

In a system where server applications are coordinated in a multi-layered structure, every processing request from clients goes to a web server. The web server delegates specific tasks for that request to an application server. If the required tasks include database access, then the application server interacts with the database server to retrieve necessary data.

In such a multi-layered system, each server application can be deployed on a plurality of server computers according to the roles that they are supposed to play. For example, a web server and an application server may be deployed on different server computers. Running server applications on separate server computers will make the system more flexible since the workloads of server application functions can be distributed over multiple computers.

Distributing applications on a plurality of server computers, however, would increase the burden of their management. Several researchers have therefore proposed a technique to automate the task of updating resources at lower-level devices by sending replacement resources and replacement job streams from upper-level devices to lower-level devices (see, for example, Japanese Patent Application Publication No. 3-238529).

To deploy applications for user service, it is necessary to synchronize the timing of their installation in multiple server computers. However, conventional deployment techniques require the applications to be set up at each individual server computer. Oversight or other human errors can happen during this process, leading to a lack of synchronism in application deployment across server computers and resulting in some problems as will be discussed below.

More specifically, multi-layered systems require a plurality of applications for each specific service function to maintain consistency among themselves. The deployment of inter-related applications has therefore to be done all at once; partial update of applications in a multi-layered system could introduce inconsistency between functions.

Also, in the case of implementing a certain function as parallel processes on a plurality of server computers, it has to be ensured that every individual server computer involved in that function can undergo automatic deployment and automatic update of applications. That is, the load-distributed parallel processing system is supposed to offer the same processing service, no matter which server computer actually works for that service. If some server computers missed an update of applications, their behavior would be inconsistent with that of the other server computers.

As can be seen from the above, the conventional multi-layered parallel processing system controls deployment of applications on an individual server computer basis, where an oversight or other human errors can easily occur in giving instructions for application deployment. For this reason, the conventional system is likely to encounter the problem of inconsistent application processing.

SUMMARY OF THE INVENTION

In view of the foregoing, it is an object of the present invention to provide a program, method, and apparatus for managing applications in such a way that resources of a plurality of applications constituting a multi-layered system can be deployed collectively on a plurality of server computers selected as platforms for each application.

To accomplish the above object, the present invention provides a computer-readable medium storing a program for managing applications in a system where a plurality of applications installed on different server computers work together to provide services. This program causes a computer to function as: target platform determining means, responsive to a request for establishing an environment for a service, for identifying server computers belonging to server groups corresponding to a plurality of functions necessary to provide the requested service, by consulting group management data that defines a plurality of server groups classified by functions thereof, and thus choosing the identified server computers as target platforms on which necessary applications will be deployed to implement the functions; and application deploying means for successively selecting deployment data of each application required to implement the functions for the requested service, sending the selected deployment data to the server computers chosen as target platforms of each application, and setting up an operation environment for each application.

Also, to accomplish the above object, the present invention provides a method of managing applications in a system where a plurality of applications installed on different server computers work together to provide services. This method comprises: with a target platform determining means responsive to a request for establishing an environment for a service, identifying server computers belonging to server groups corresponding to a plurality of functions necessary to provide the requested service, by consulting group management data that defines a plurality of server groups classified by functions thereof, and thus choosing the identified server computers as target platforms on which necessary applications will be deployed to implement the functions; and with an application deploying means, successively selecting deployment data of each application required to implement the functions for the requested service, sending the selected deployment data to the server computers chosen as target platforms of each application, and setting up an operation environment for each application.

Further, to accomplish the above object, the present invention provides an apparatus for managing applications in a system where a plurality of applications installed on different server computers work together to provide services. This apparatus comprises: target platform determining means, responsive to a request for establishing an environment for a service, for identifying server computers belonging to server groups corresponding to a plurality of functions necessary to provide the requested service, by consulting group management data that defines a plurality of server groups classified by functions thereof, and thus choosing the identified server computers as target platforms on which necessary applications will be deployed to implement the functions; and application deploying means for successively selecting deployment data of each application required to implement the functions for the requested service, sending the selected deployment data to the server computers chosen as target platforms of each application, and setting up an operation environment for each application.

The above and other objects, features and advantages of the present invention will become apparent from the following description when taken in conjunction with the accompanying drawings which illustrate preferred embodiments of the present invention by way of example.

BRIEF DESCRIPTION OF THE DRAWINGS

FIG. 10 shows an example data structure of a status data set.

FIG. 18 shows a server definition dialog.

DESCRIPTION OF THE PREFERRED EMBODIMENTS

A preferred embodiment of the present invention will be described below with reference to the accompanying drawings.

The description begins with an overview of the present invention and then proceeds to a more specific embodiment of the invention.

Figure 1:
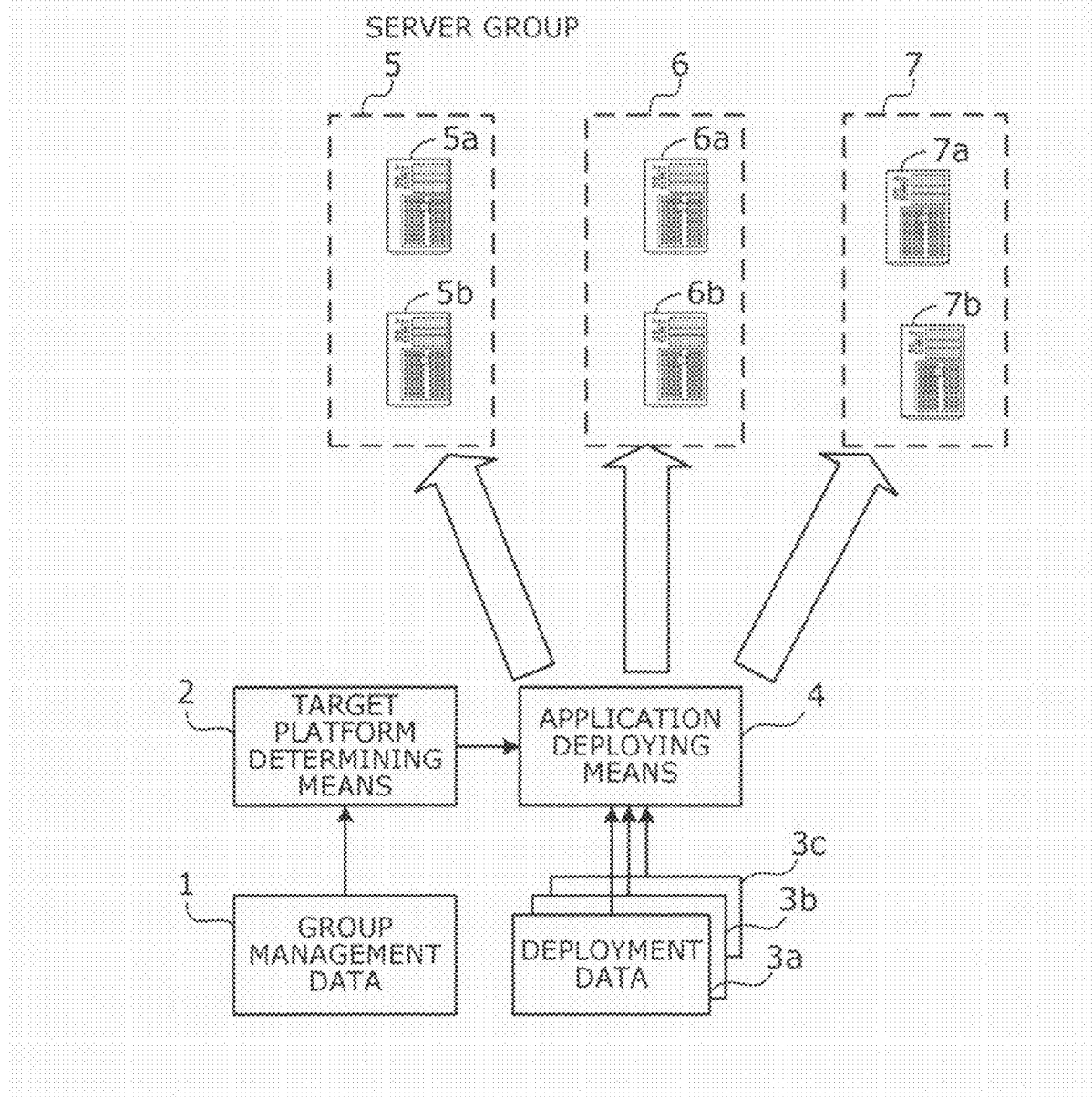
FIG. 1 shows the concept of a system in which the present invention is embodied.

FIG. 1 shows the concept of a system in which the present invention is embodied. To manage server computers 5a, 5b, 6a, 6b, 7a, and 7b each belonging to one of a plurality of server groups 5, 6, and 7 classified by their functions, the present invention provides a group management data 1, a target platform determining means 2, deployment data 3a, 3b, and 3c, and an application deploying means 4.

The group management data 1 defines a plurality of server groups 5, 6, and 7 classified by functions that they are supposed to offer. The group management data 1 indicates to which server group each server computer 5a, 5b, 6a, 6b, 7a, and 7b should belong. In the example of FIG. 1, the server group 5 includes server computers 5a and 5b. The server group 6 includes server computers 6a and 6b. The server group 7 includes server computers 7a and 7b.

The target platform determining means 2 is responsive to a request for establishing an environment for a specific service. Upon receipt of such a request, the target platform determining means 2 consults the group management data 1 to identify server computers 5a, 5b, 6a, 6b, 7a, and 7b belonging to server groups 5, 6, and 7 corresponding to a plurality of functions necessary to provide the requested service. The target platform determining means 2 chooses those server computers as target platforms on which necessary applications will be deployed to implement the functions. Suppose, for example, that the server group 5 provides web server functions. Then the target platform determining means 2 chooses server computers 5a and 5b as target platforms for web server deployment.

The application deploying means 4 successively selects deployment data 3a, 3b, and 3c of each application required to implement the functions for the requested service. The application deploying means 4 then deploys the selected deployment data of each application to the server computers chosen as the target platforms for that application. More specifically, the application deploying means 4 establishes an operating environment for each application by sending its deployment data to server computers and remotely manipulating those server computers.

The above-described system operates as follows. When there is a request for a specific service environment, the target platform determining means 2 consults the group management data 1 to identify server computers as target platforms on which necessary applications will be deployed to implement functions for the requested service. The application deploying means 4 then successively selects deployment data 3a, 3b, and 3c of each application required to implement the functions for the requested service. The application deploying means 4 sends the selected deployment data to the server computers identified as target platforms.

The proposed mechanism enables a multi-layered system to replace deployed application resources with a single action. That is, various tasks for deploying applications over multiple layers of servers can be achieved by a single operation. This eliminates the possibility of introducing inconsistency between the server applications deployed on the server computers 5a, 5b, 6a, 6b, 7a, and 7b.

The application deploying means 4 may control the order of applications when deploying them, depending on call relationships between applications. Suppose, for example, that there is an application that calls up another application. Based on this call relationships, the application deploying means 4 selects and deploys the calling application prior to the called application. To deploy the called application, the application deploying means 4 uses information about the calling application that has been deployed earlier, so that the called application can be associated with the calling application automatically at the time of deployment.

The application deploying means 4 keeps records of applications deployed on each server. If it is unable to deploy an application on some server computers, the application deploying means 4 may inhibit those server computers from subsequent updates. This ensures uniformity of the applications installed on parallel servers, thus preventing the operating environment from being infected with inconsistency as a result of repeated updates to the applications.

Figure 2:
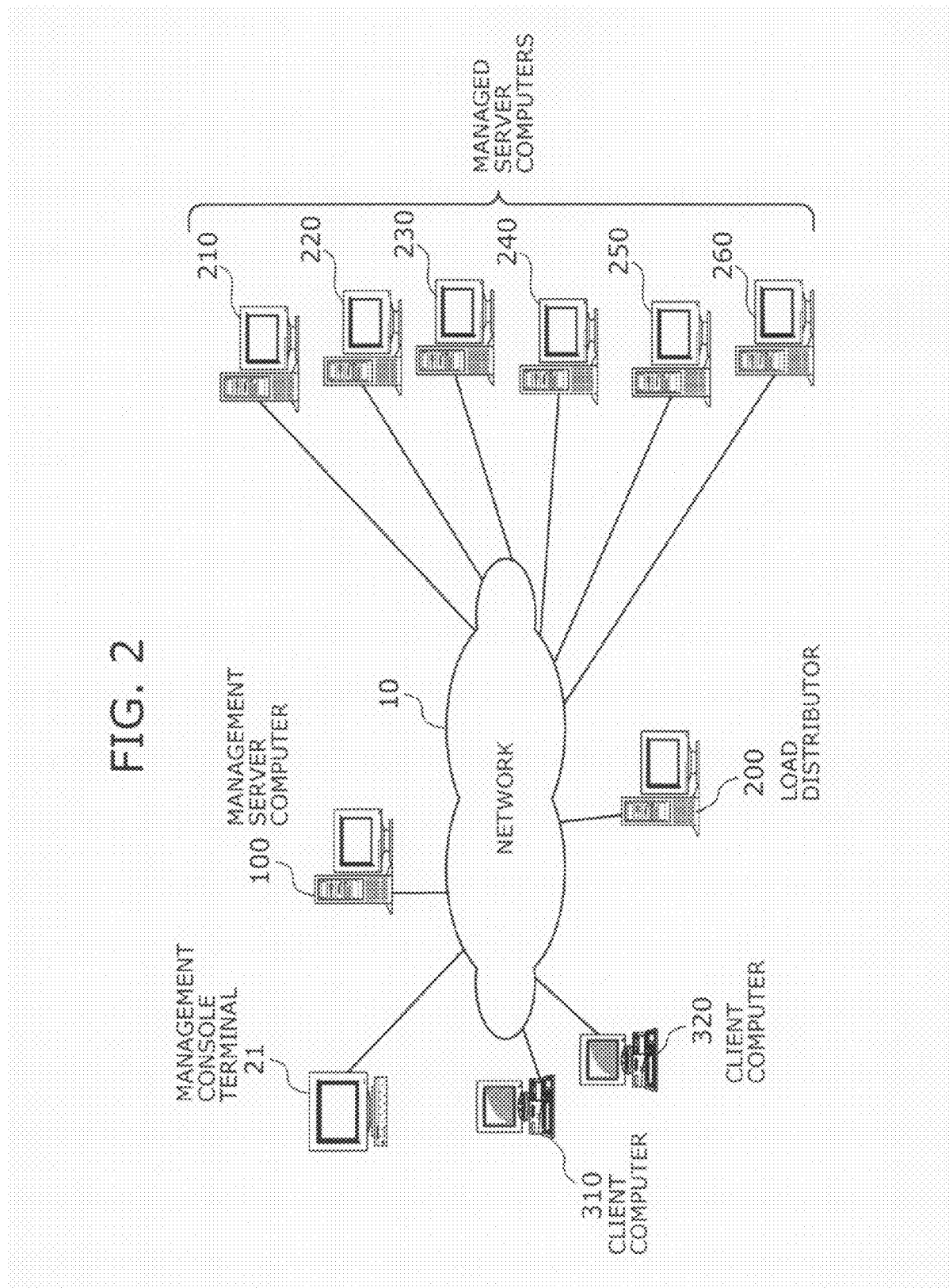
FIG. 2 shows a system configuration according to an embodiment of the invention.

FIG. 2 shows an example system configuration according to an embodiment of the invention. The system according to the present embodiment includes the following elements connected on a network 10: a management server computer 100, a load distributor 200, a plurality of managed server computers 210, 220, 230, 240, 250, and 260, client computers 310 and 320, and a management console terminal 21.

The management server computer 100 takes care of the managed server computers 210, 220, 230, 240, 250, and 260. Specifically, the management server computer 100 deploys necessary server applications on those managed server computers to provide a service to client computers 310 and 320. More specifically, it sends required resources such as application programs to each managed server computer 210, 220, 230, 240, 250, and 260 and sets up an operating environment for those server applications.

The load distributor 200 receives service requests from client computers 310 and 320 and redirects them to the managed server computers, such that the requests will be processed in a distributed way.

The managed server computers 210, 220, 230, 240, 250, and 260 offer specific services upon request from the client computers 310 and 320. Necessary resources for the services are supplied from the management server computer 100. Further the management server computer 100 remotely sets up an operating environment in each managed server computer 210, 220, 230, 240, 250, and 260 so that they can provide the services.

The client computers 310 and 320 issue a service request to an appropriate managed server computer 210, 220, 230, 240, 250, and 260 in response to user inputs.

The system administrator enters commands to his/her management console terminal 21 in an attempt to establish a service environment or to define server configuration or the like. The management console terminal 21 communicates with the management server computer 100 to execute the commands.

Figure 3:
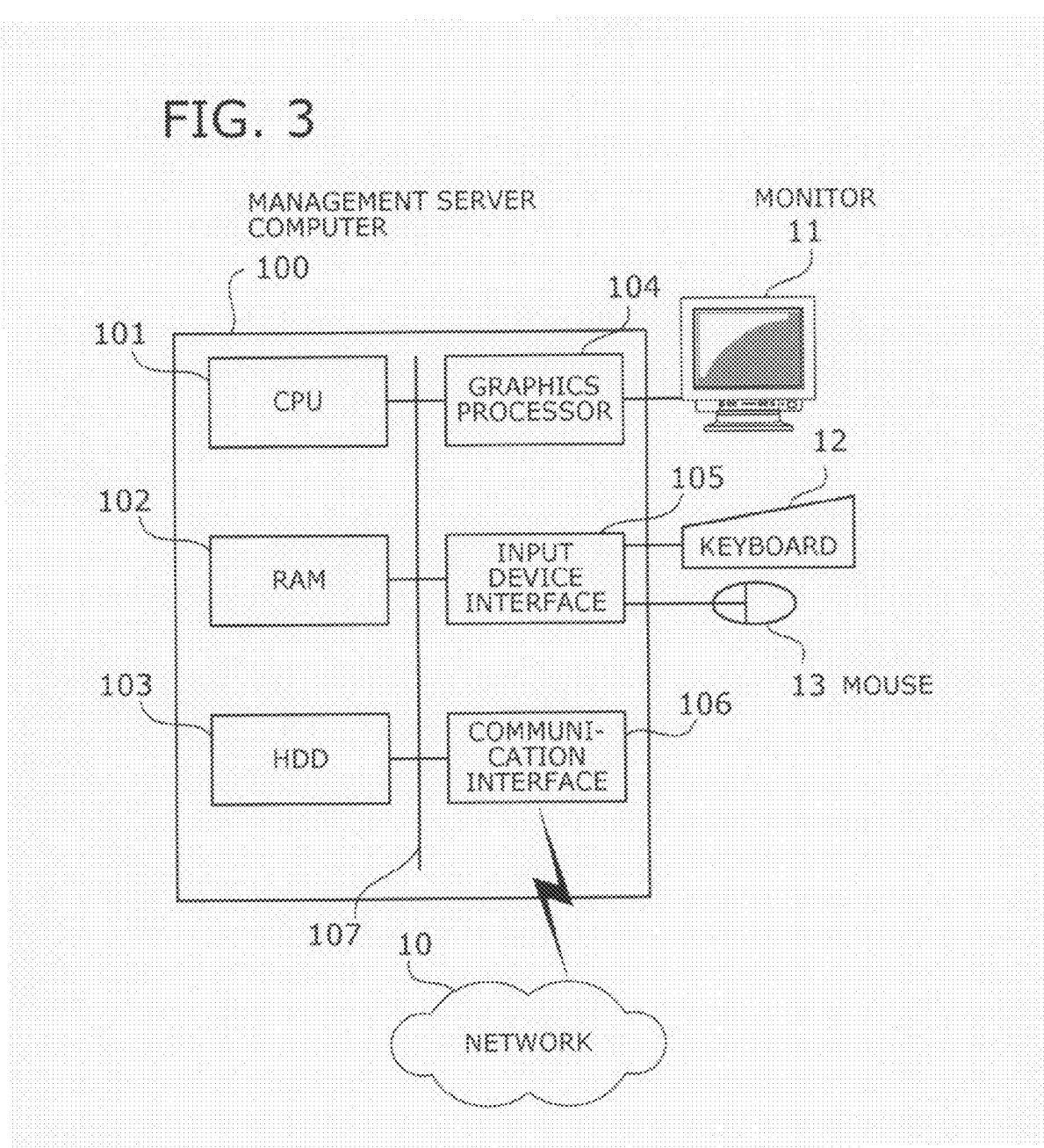
FIG. 3 shows an example hardware configuration of a management server computer according to the present embodiment.

FIG. 3 shows an example hardware configuration of the management server computer according to the present embodiment. The entire system of this management server computer 100 is controlled by a central processing unit (CPU) 101. Coupled to this CPU 101 via a bus 107 are: a random access memory (RAM) 102, a hard disk drive (HDD) 103, a graphics processor 104, an input device interface 105, and a communication interface 106.

The RAM 102 serves as temporary storage for at least part of operating system (OS) programs and application programs that the CPU 101 executes, in addition to other various data objects manipulated at runtime. The HDD 103 stores OS program files and application programs.

A monitor 11 is coupled to the graphics processor 104. The graphics processor 104 produces video images in accordance with commands from the CPU 101 and displays them on the screen of the monitor 11. The input device interface 105 is used to connect a keyboard 12 and a mouse 13. The input device interface 105 receives signals from the keyboard 12 and mouse 13 and sends them to the CPU 101 via the bus 107.

The communication interface 106 is connected to a network 10. Via this network 10, the communication interface 106 exchanges data with other computers.

The hardware platform described above is used to realize the processing functions of the present embodiment. While FIG. 3 illustrates the management server computer 100 as an example hardware configuration, the same hardware configuration can also be applied to other devices including the load distributor 200, managed server computers 210, 220, 230, 240, 250, and 260, client computers 310 and 320, and management console terminal 21.

In the above-described system, the management server computer 100 takes care of managed server computers 210, 220, 230, 240, 250, and 260, classifying them into a plurality of server groups according to their processing functions. The term "server group" refers to a collection of managed server computers that share the same service configuration to provide a particular service and should thus be managed collectively by the management server computer 100.

Figure 4:
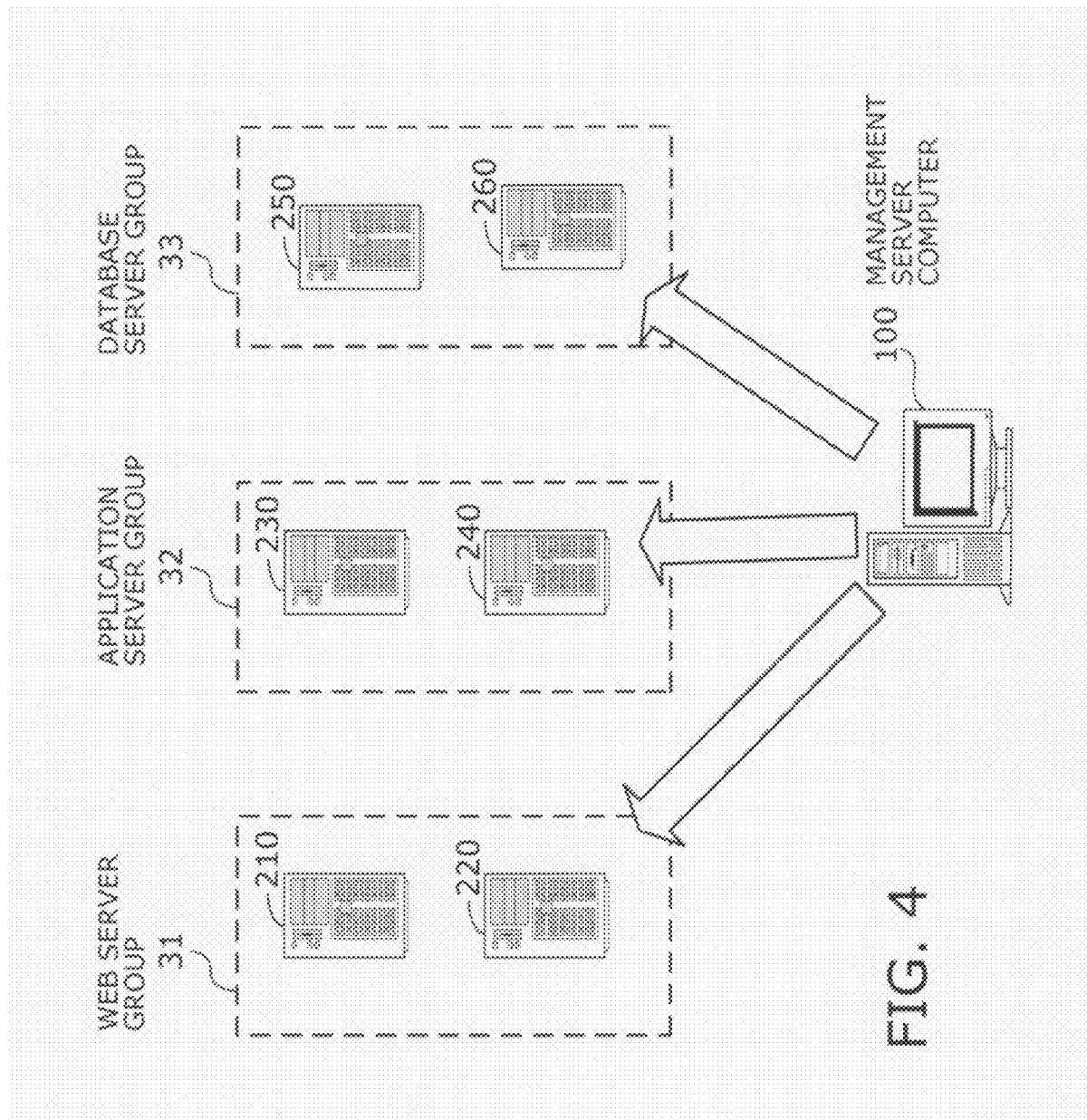
FIG. 4 shows an example of server groups.

FIG. 4 shows an example of server groups. In this example the managed server computers 210, 220, 230, 240, 250, and 260 are classified into three server groups.

Web server group 31 includes two managed server computers 210 and 220 on which web server functions are installed. Application server group 32 includes two managed server computers 230 and 240 on which application server functions are installed. Database server group 33 includes two managed server computers 250 and 260 on which database server functions are installed.

The management server computer 100 has the function of remotely manipulating each server group, as well as managing each server group in a unified manner. More specifically, the management server computer 100 manages call relationships (or logical connections) between managed server computers in an environment where multiple-layered applications provide services to client computers 310 and 320. The call relationships may be implemented as mesh connection or line connection between servers. The mesh connection distributes the load to servers linked in a mesh topology. The line connection does the same with servers linked in a line topology.

Figure 5:
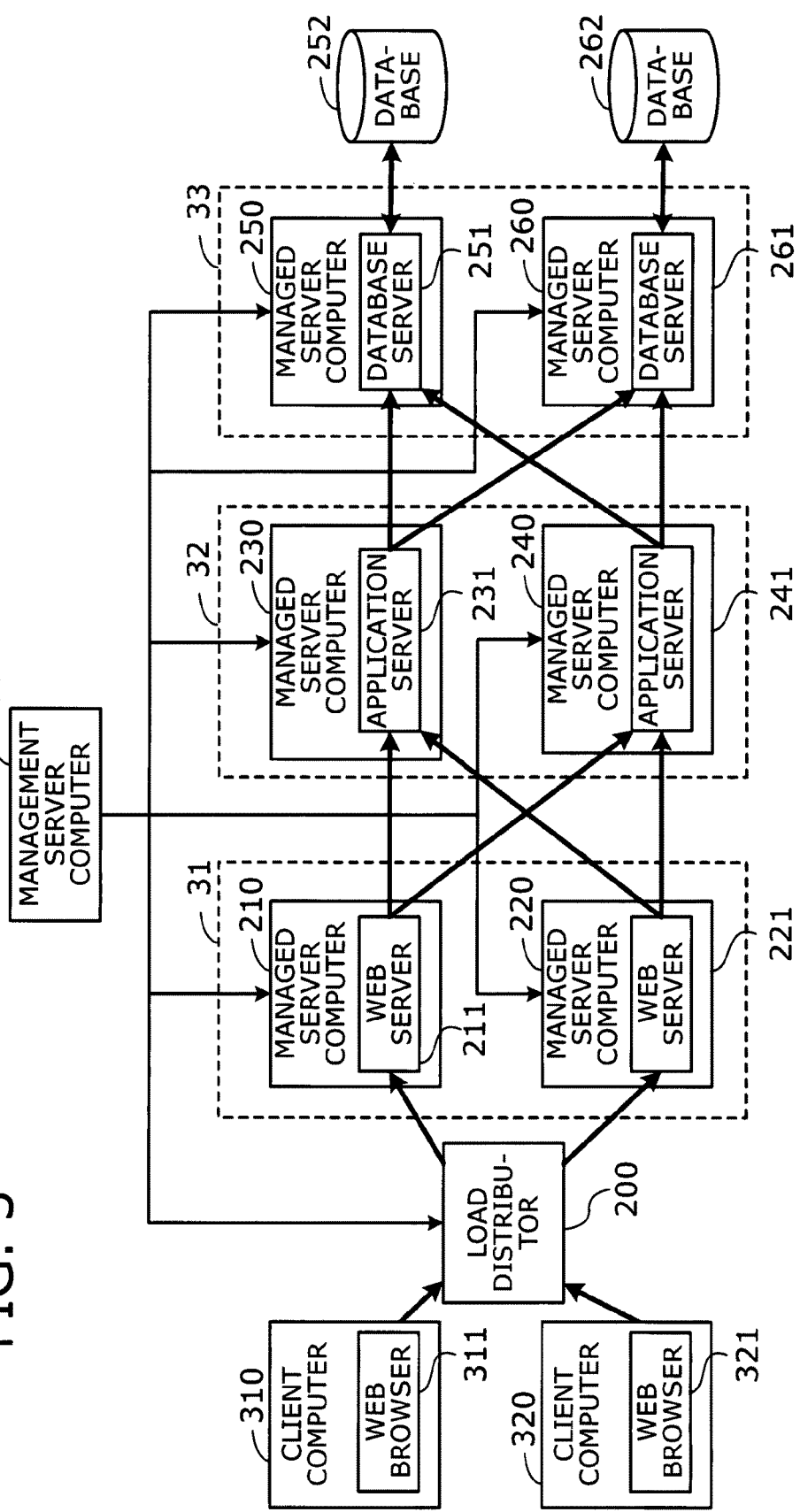
FIG. 5 shows an example of mesh connection.

FIG. 5 shows an example of mesh connection. In this example, the managed server computers 210 and 220 accommodate server applications that work as web servers 211 and 221, respectively. The managed server computers 230 and 240 accommodate server applications that work as application servers 231 and 241, respectively. The managed server computers 250 and 260 accommodate server applications that work as database servers 251 and 261, respectively. The database servers 251 and 261 manage corresponding databases 252 and 262.

The timing of deployment of those server applications on the managed server computers 210, 220, 230, 240, 250, and 260 is controlled by the management server computer 100. The management server computer 100 is also responsible for managing detailed setup of distribution tasks at the load distributor 200.

The mesh connection links each web server 211 and 221 in the web server group 31 with both application servers 231 and 241 in the application server group 32. Likewise, each application server 231 and 241 in the application server group 32 is linked with both database servers 251 and 261 in the database server group 33.

The client computers 310 and 320 have a web browser 311 and 321 installed in them. The users sitting at those client computers 310 and 320 enter various commands to their corresponding web browsers 311 and 321. The web browsers 311 and 321 parse each given user command, and if the command requires a specific service available on the network 10, they issue a service request accordingly.

The load distributor 200 accepts such a service request from the web browsers 311 and 321 and redirects it to either the web server 211 or the web server 221. Upon receipt of the request, the receiving web server 211 or 221 directs the task to either the application server 231 or the application server 241. The called application server 231 or 241 executes the task. The task may necessitate database access during the course of execution. If that is the case, the application server 231 or 241 calls up its corresponding database server 251 or 261 to delegate that part of the task. The called database server 251 or 261 makes access to the database accordingly.

Each called server returns its processing result to the calling server. The final result thus reaches the web browser 311 or 321 that issued the original service request.

A hierarchical structure of server applications is derived from their call relationships; a server application closer to the client computers 310 and 320 takes a higher level in the hierarchy. To newly deploy a low-level server application, or to update an existing low-level server application in this structure, it is necessary to have information about higher-level server applications. For example, a requesting high-level server application may have to provide an IP address and other data on its corresponding managed server computer as environment variables for use by low-level server applications.

In this case, the deployment of applications must begin with the highest-level application and then go down to lower-level applications. Think of, for example, deploying database servers 251 and 261 on the managed server computers 250 and 260, respectively. To achieve this deployment, at least one of the application servers 231 and 241 has to be deployed successfully. Similarly, deploying application servers 231 and 241 on the managed server computers 230 and 240 assumes that at least one web server 211 or 221 has been deployed successfully.

Figure 6:
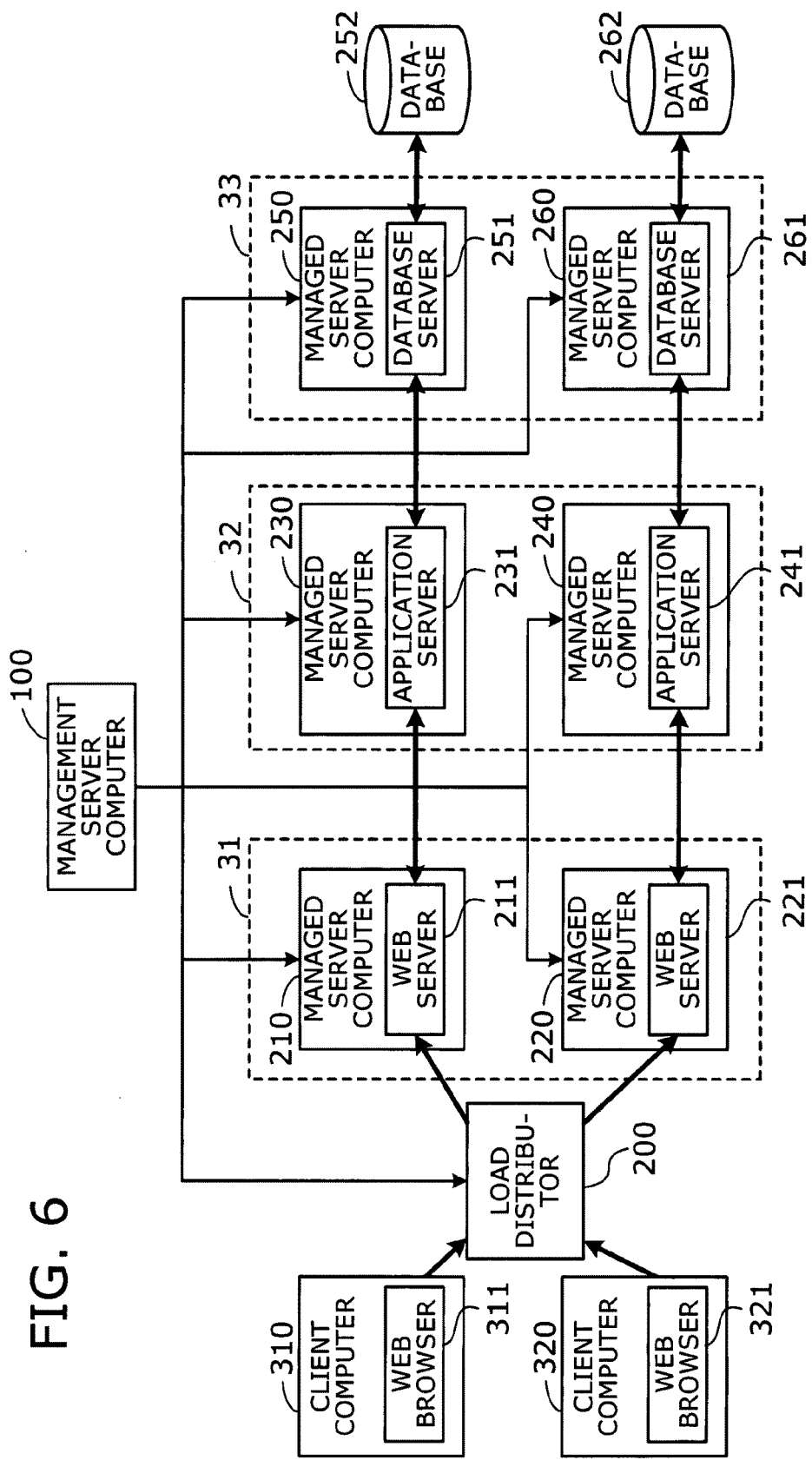
FIG. 6 shows an example of line connection.

FIG. 6 shows an example of line connection. The line connection permits each server belonging to one server group to be linked with only one server belonging to another group. In the example of FIG. 6, a web server 211 is linked with an application server 231, and the application server 231 is linked with a database server 251. Likewise, a web server 221 is linked with an application server 241, and the application server 241 is linked with a database server 261. Those linked servers provide multi-layered services.

The line connection permits each managed server computer belonging to one server group to be linked with only one managed server computer belonging to another group. For this reason, deploying a server application on a particular managed server computer requires its associated higher-level server computer to have a server application successfully installed beforehand.

Think of, for example, deploying a database server 251 on the managed server computer 250. To achieve this deployment, the application servers 231 has to be deployed successfully. Also, deploying an application server 231 on the managed server computer 230 assumes that a web server 211 has been deployed successfully.

Similarly, deploying a database server 261 on the managed server computer 260 assumes that an application server 241 has been deployed successfully. Also, deploying an application server 241 on the managed server computer 240 assumes that a web server 221 has been deployed successfully.

As can be seen from the above, a successful deployment of lower-level server applications depends on whether the system uses mesh connection or line connection. The management server computer 100 therefore manages the connection topology of servers for each service to be provided to client computers 310 and 320. When deploying server applications, the management server computer 100 uses the information about connection topologies to control the sequence of deployment tasks.

Figure 7:
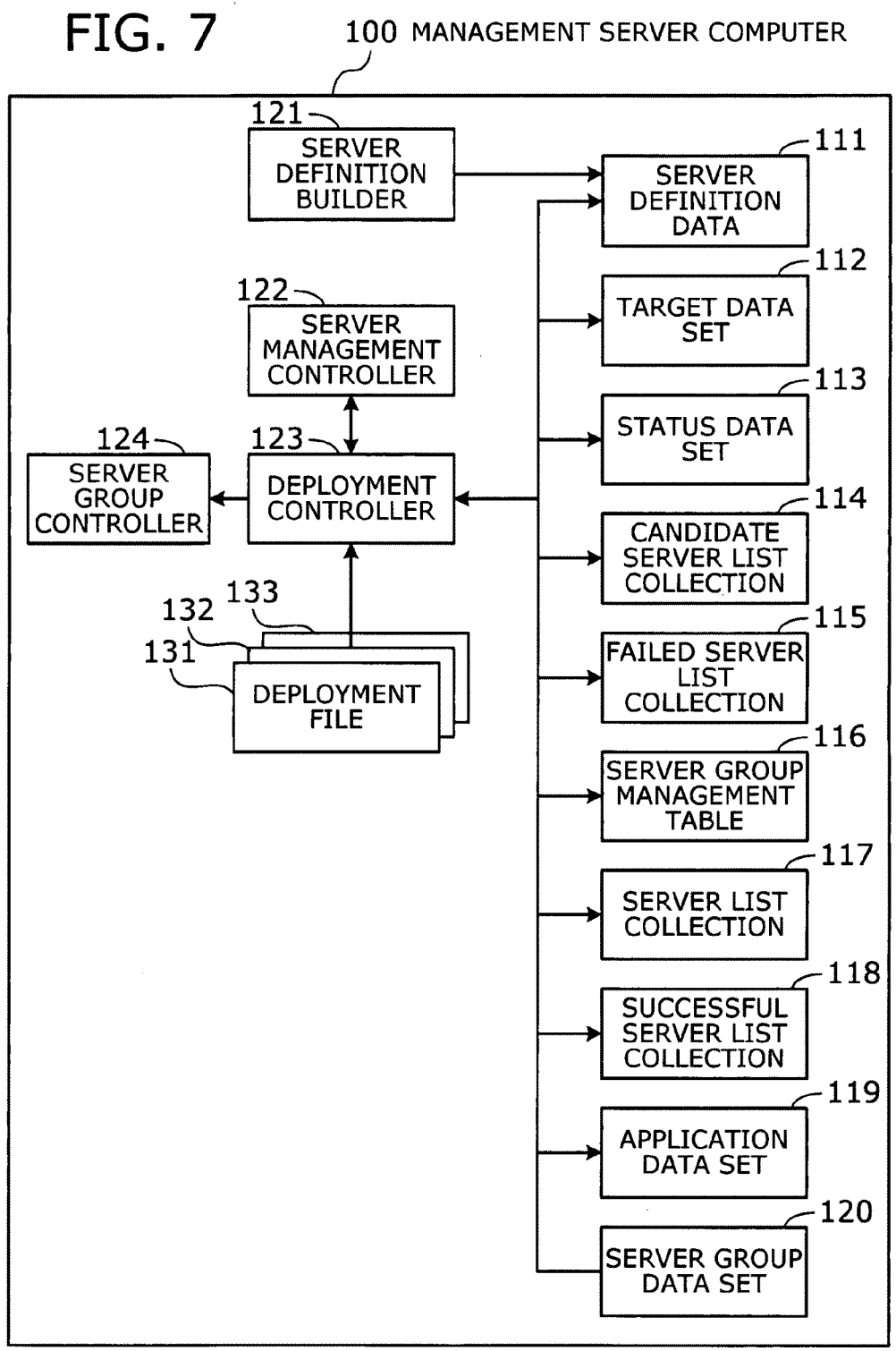
FIG. 7 is a functional block diagram of the management server computer.

FIG. 7 is a functional block diagram of the management server computer. The illustrated management server computer 100 includes the following elements: server definition data 111, target data set 112, a status data set 113, a candidate server list collection 114, a failed server list collection 115, a server group management table 116, a server list collection 117, a successful server list collection 118, an application data set 119, a server group data set 120, a server definition builder 121, a server management controller 122, a deployment controller 123, a server group controller 124, and a plurality of deployment files 131, 132, and 133.

The server definition data 111 describes managed server computers and the like which provide users with multiple-layered services.

The target data set 112 is a collection of target data describing managed server computer on which server applications are installed.

The status data set 113 is a collection of status data indicating results of control operations (e.g., create, start, stop) performed on each managed server computer.

The candidate server list collection 114 is a collection of candidate server lists, i.e., the information about managed server computers on which applications can be deployed.

The failed server list collection 115 is a collection of failed server lists, i.e., the information about managed server computers that have failed to deploy an application.

The server group management table 116 contains pointers to server lists describing each specific server group.

The server list collection 117 is a collection of server lists that enumerate managed server computers belonging to each specific server group.

The successful server list collection 118 is a collection of successful server lists, i.e., the information about managed server computers on which applications have been deployed successfully.

The application data set 119 is a collection of application data describing applications that have been deployed.

The server group data set 120 is a collection of server group data describing each specific server group. The server definition builder 121 enters given data to the server definition data 111 in response to user commands.

The server management controller 122 consults the server definition data 111 in response to a request from the administrator for deployment of server applications, thus retrieving information about a requested service. Then the server management controller 122 passes a deployment command to the deployment controller 123, specifying which server applications to deploy.

The deployment controller 123 deploys server applications on managed server computers to implement database server, application server, and web server functions according to the given deployment command. More specifically, the deployment controller 123 first determines the order of server applications to be deployed. Then according to that order, the deployment controller 123 commands the server group controller 124 to deploy deployment files 131, 132, and 133 to relevant managed server computers.

The server group controller 124 deploys server applications by making access to each managed server computers according to the command from the deployment controller 123. More specifically, the server group controller 124 sends a deployment file corresponding to each server application to relevant managed server computers and then remotely manipulates those managed server computers to set up an operating environment for each server application.

The deployment files 131, 132, and 133 are application software resources to be deployed on managed server computers. Each deployment file 131, 132, and 133 contains executive programs and various data objects required for their execution on the managed server computers.

Referring now to FIGS. 8 to 12, the following section will describe, by way of example, the structure of each data object used in the management server computer 100.

Figure 8:
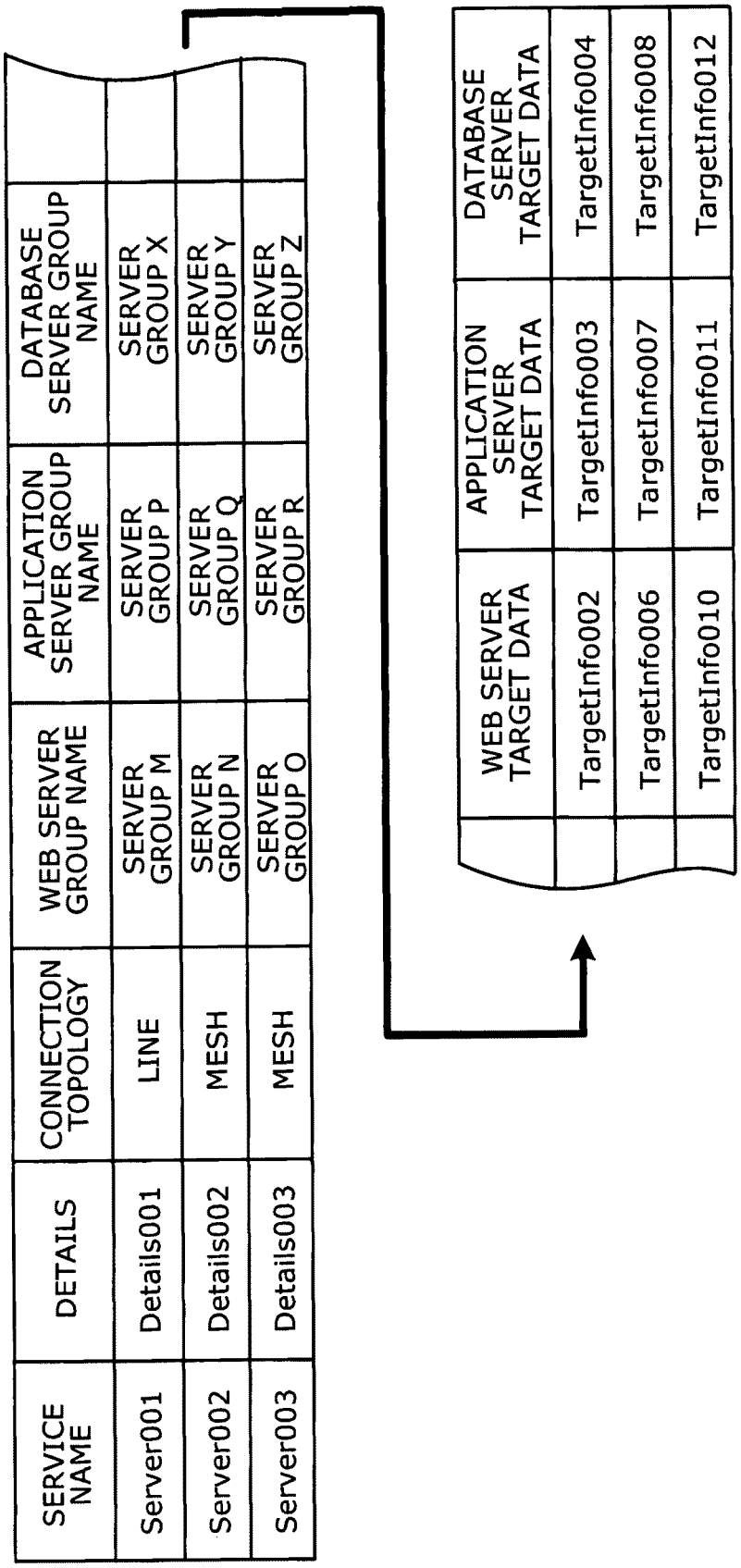
FIG. 8 shows an example data structure of server definition data.

FIG. 8 shows an example data structure of server definition data. The server definition data 111 has data fields titled as follows: "Service Name," "Details," "Connection Topology," "Web Server Group Name," "Application Server Group Name," "Database Server Group Name," "Web Server Target Data," "Application Server Target Data," and "Database Server Target Data."

The service name field contains the name of a service to be provided to client computers, and the details field gives some specifics about that service.

The connection topology field indicates the topology of logical connection between multiple-layered servers coordinated to provide the service. Possible values for this field include mesh connection and line connection.

The web server group name field contains a name that uniquely identifies each web server group. The application server group name field contains a name that uniquely identifies each application server group. The database server group name field contains a name that uniquely identifies each database server group.

The web server target data field contains a pointer to specific target data that shows target platforms for web servers belonging to the specified web server group. The application server target data field contains a pointer to specific target data that shows target platforms for application servers belonging to the specified application server group. The database server target data field contains a pointer to specific target data that shows target platforms for database servers belonging to the specified database server group.

Figure 9:
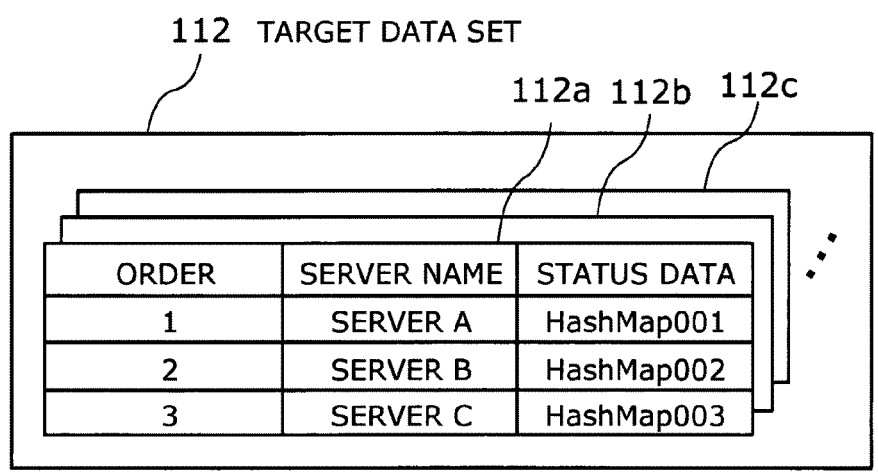
FIG. 9 shows an example data structure of a target data set.

FIG. 9 shows an example data structure of a target data set. The target data set 112 is a collection of target data 112a, 112b, 112c, . . . corresponding to different server groups. Specifically the target data 112a has data fields titled as follows: "Order," "Server Name," and "Status Data." The same applies to other target data 112b, 112c, and so on.

The order field specifies the order of server applications within a server group. This order represents in what order the server applications have taken part in the server group.

The server name field gives the name of a managed server computer accommodating a server application belonging to the server group that the target data 112a describes.

The status data field gives the name of status data indicating the condition of a server application installed in the corresponding managed server computer.

FIG. 10 shows an example data structure of a status data set. The illustrated status data set 113 is a collection of status data 113a, 113b, 113c, . . . each corresponding to a specific server application.

Each status data 113a, 113b, 113c, . . . has data fields titled as follows: "Operation," "Status," "Message," and "Details." The operation field gives the names of operations that the management server computer 100 have made or may make to the corresponding server application. Specifically, such operations include "Create," "Update," and "Delete." "Create" refers to an operation newly deploying a server application on a managed server computer. "Update" refers to an operation bringing the content of a server application up to date. "Delete" refers to an operation removing an existing server application from a managed server computer.

The status field indicates whether the corresponding operation has successfully finished. The message field defines a message that will appear on a screen of the management console terminal 21 to indicate the result of an operation. The details field is used to describe some special issue regarding the operation (e.g., reason for a failed operation).

Figure 11:
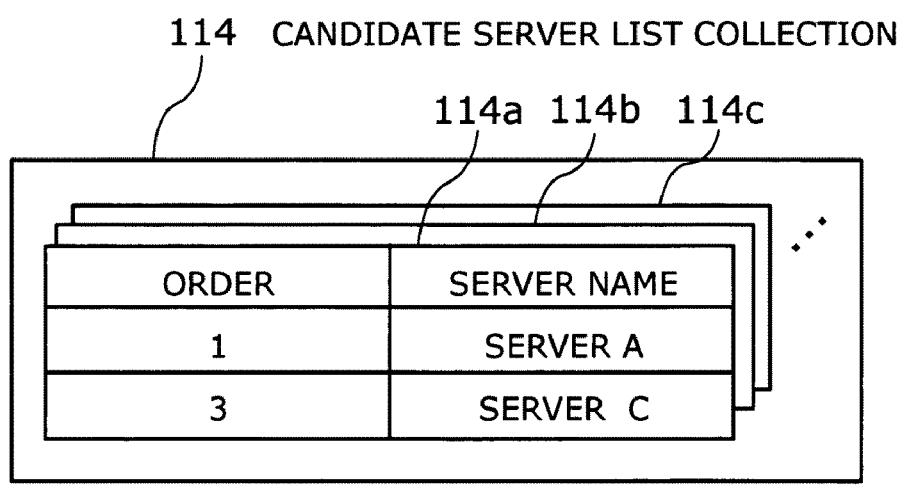
FIG. 11 shows an example data structure of a candidate server list collection.

FIG. 11 shows an example data structure of a candidate server list collection. The candidate server list collection 114 includes candidate server lists 114a, 114b, 114c, . . . each corresponding to a specific server group.

The candidate server list 114a has data fields entitled "Order" and "Server Name," as have other candidate server lists 114b, 114c, and so on.

The order field of this list 114a contains the order values of server applications that have successfully been deployed, of all those listed in the corresponding target data 112a for the same server group. Likewise, the server name field gives the names of managed server computers that have been successful in server application deployment.

Figure 12:
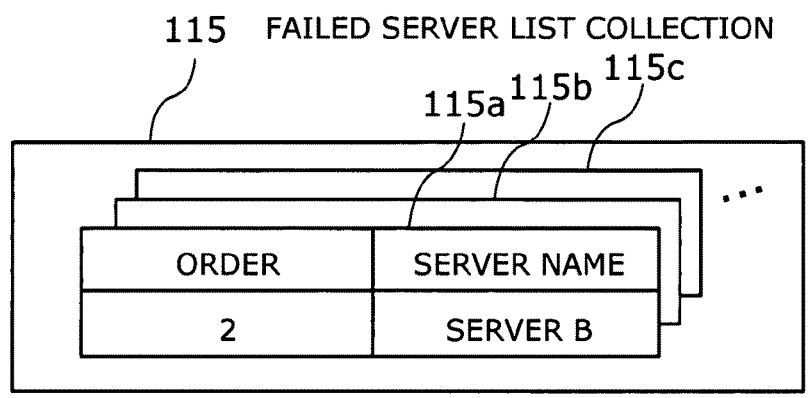
FIG. 12 shows an example data structure of a failed server list collection.

FIG. 12 shows an example data structure of a failed server list collection. The failed server list collection 115 includes failed server lists 115a, 115b, 115c, . . . each corresponding to a specific server group.

The failed server list 115a has data fields titled "Order" and "Server Name," as have other failed server lists 115b, 115c, and so on.

The order field of this list 115a contains the order values of server applications whose deployment was unsuccessful, of all those listed in the corresponding target data 112a for the same server group. Likewise, the server name field gives the names of managed server computers that were unsuccessful in server application deployment.

Figure 13:
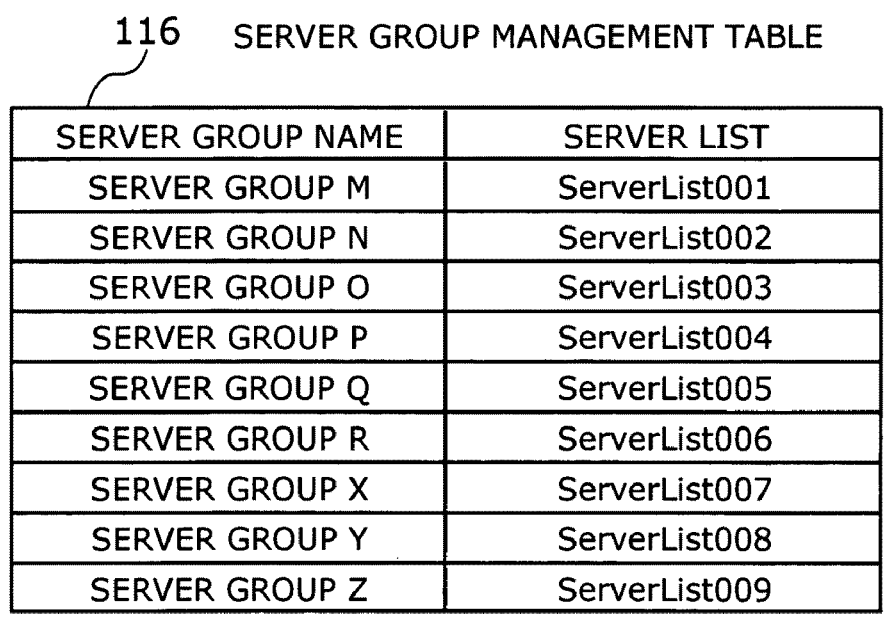
FIG. 13 shows an example data structure of a server group management table.

FIG. 13 shows an example data structure of a server group management table. The server group management table 116 has data fields titled "Server Group Name" and "Server List."

The server group name field contains a name that uniquely identifies each server group defined in the system. The server list field contains a pointer to a server list describing the corresponding server group.

Figure 14:
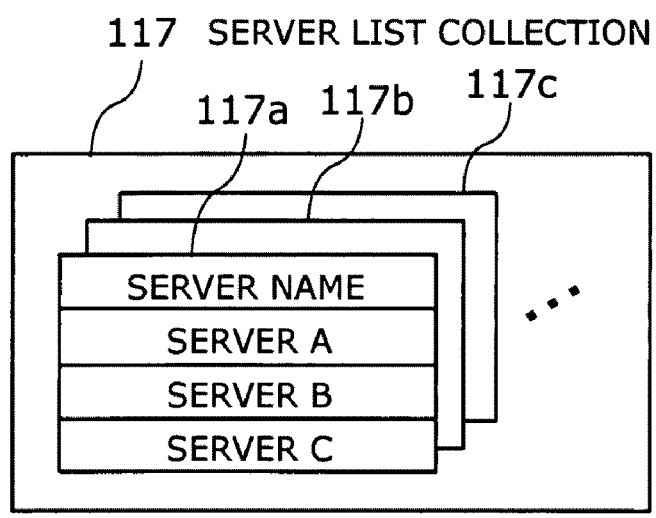
FIG. 14 shows an example data structure of a server list collection.

FIG. 14 shows an example data structure of a server list collection. The server list collection 117 includes server lists 117a, 117b, 117c, . . . each corresponding to a specific server group. Each server list 117a, 117b, 117c, . . . enumerates the names of managed server computers belonging to the corresponding server group.

The server group controller 124 consults those server lists 117a, 117b, 117c, . . . when it deploys applications. More specifically, the deployment process includes repetitive selection of managed server computers in a specific server group. The server group controller 124 looks up a data table for this selection. The simpler the data table is, the faster the selection task finishes. The present embodiment prepares server lists 117a, 117b, 117c, . . . for the purpose of selection of managed server computers, thus enhancing the speed of repetitive selection.

Figure 15:
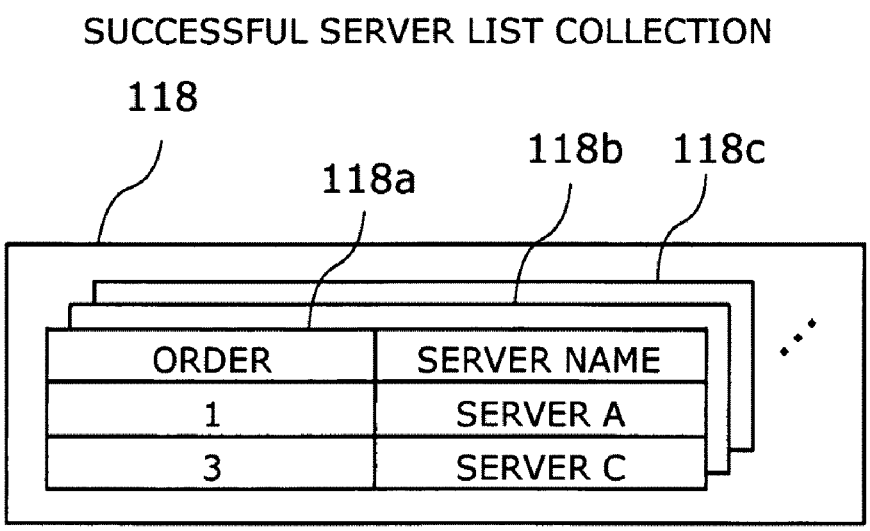
FIG. 15 shows an example data structure of a successful server list collection.

FIG. 15 shows an example data structure of a successful server list collection. The successful server list collection 118 includes successful server lists 118a, 118b, 118c, . . . each corresponding to a specific server group.

The successful server list 118a has data fields entitled "Order" and "Server Name," as have other successful server lists 118b, 118c, and so on.

The order field of this list 118a contains the order values of server applications that have successfully been deployed, of all those listed in the corresponding target data 112a for the same server group. Likewise, the server name field gives the names of managed server computers that have been successful in server application deployment.

Figure 16:
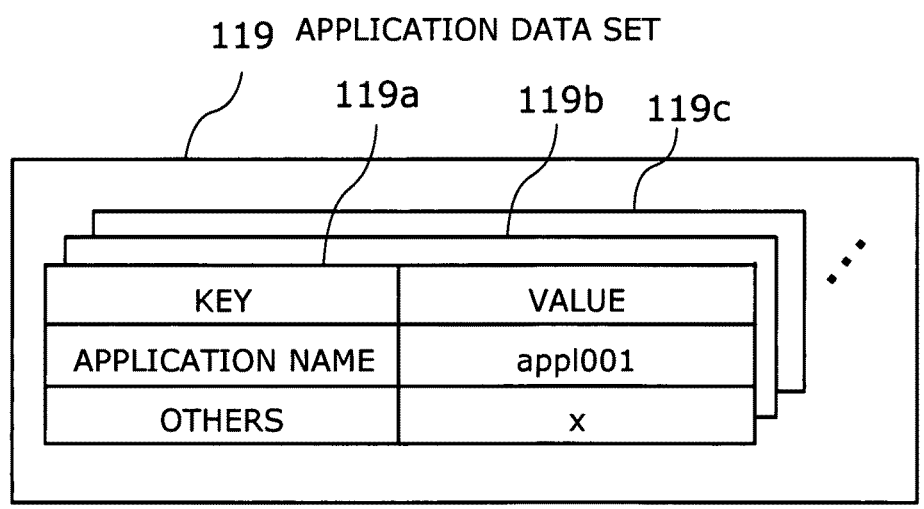
FIG. 16 shows an example data structure of an application data set.

FIG. 16 shows an example data structure of an application data set. The application data set 119 includes application data 119a, 119b, 119c, . . . each corresponding to a deployed application.

The application data 119a has data fields entitled "Key" and "Value," as have other application data 119b, 119c, and so on.

The key field contains the name of a key, a piece of information about the application. The value field contains a value assigned to the key.

Figure 17:
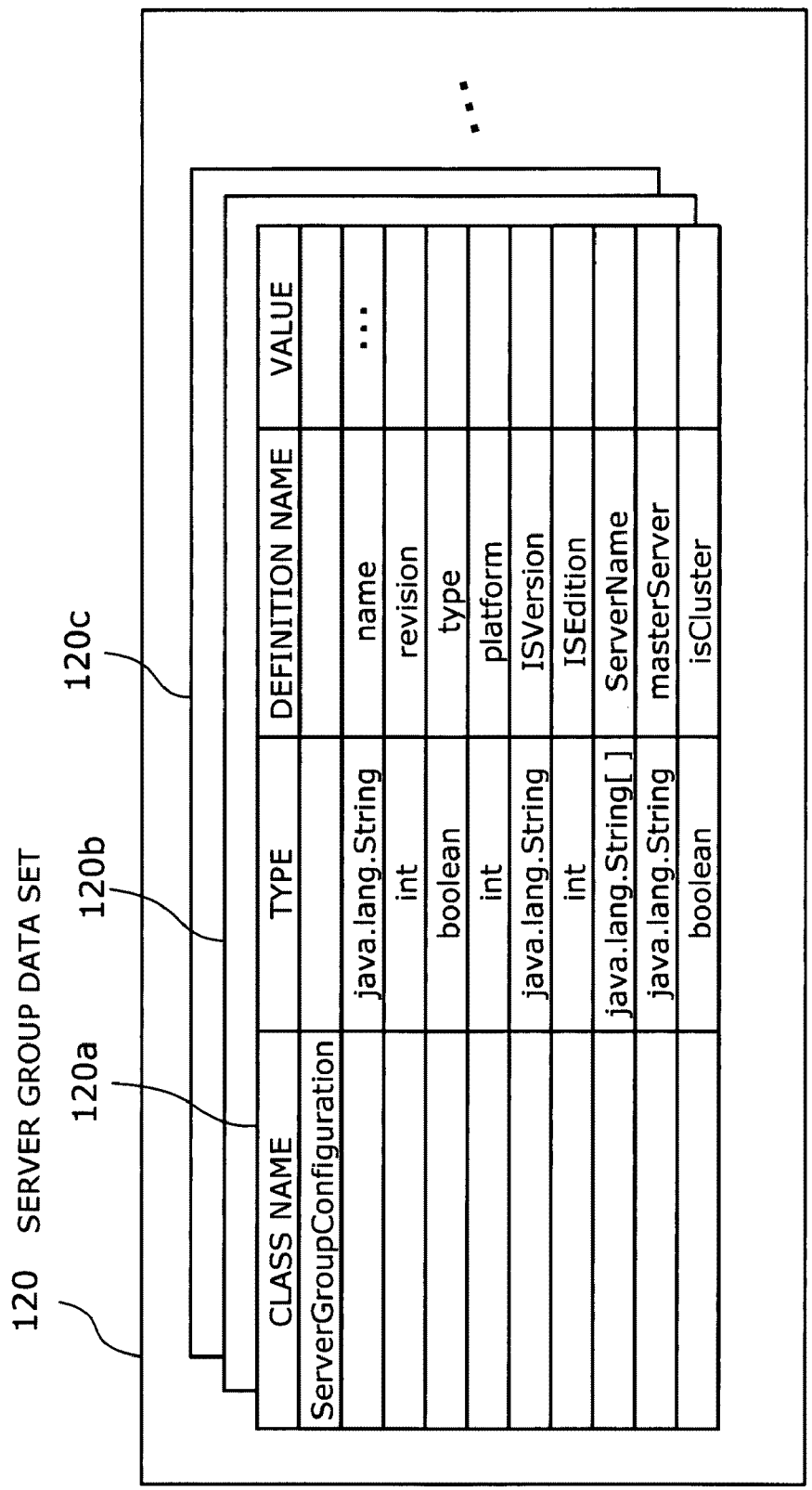
FIG. 17 shows an example data structure of a server group data set.

FIG. 17 shows an example data structure of a server group data set. The server group data set 120 includes server group data 120a, 120b, 120c, . . . each describing a specific server group.

The server group data 120a has data fields titled as follows: "Class Name," "Type," "Definition Name," and "Value." The class name field contains the name of a class that defines an object pertaining to the server group. The type field gives the type of data pertaining to the server group. The definition name and value fields contain the name and value of that data.

Data object with a definition name of "name" represents the name of the server group. Data object with a definition name of "revision" represents the revision number of the server group. Data object with a definition name of "type" represents the type of the server group. Data object with a definition name of "platform" represents the name of a platform for the server group. Data object with a definition name of "ISVersion" represents the name of a function that manages the server group. Data object with a definition name of "ISEdition" represents the edition of that function. Data object with a definition name of "ServerName" gives the names of servers belonging to the server group. Data object with a definition name of "masterServer" represents the server name of a server computer that will be a master in cloning. This master computer serves as the source of configuration data for setting up an operating environment on a server computer newly added to the server group. Data object with a definition name of "is Cluster" is a parameter indicating whether it is a server group or a cluster group.

The server definition builder 121 creates server definition data as follows.

FIG. 18 shows a server definition dialog. This server definition dialog 40 is formed from a service name entry section 41, a service type selection section 42, a deployment type selection section 43, a target selection section 44, an inter-server relation selection section 45, and a CREATE button 46.

The service name entry section 41 is used to specify which service to provide to users, by entering a name that uniquely identifies that service.

The service type selection section 42 is used to select a specific service type. In the example of FIG. 18, it is possible to select either Java™ 2 Platform, Enterprise Edition (J2EE) or Common Object Request Broker Architecture (CORBA). It is allowed, in the case of J2EE applications, to create a multi-layered system formed from, for example, web servers, servlets, and Enterprise JavaBeans (EJB). Servlets correspond to application servers, and EJB servers correspond to database servers. J2EE applications allow a plurality of application servers to be deployed in a parallel fashion on each layer.

The deployment type selection section 43 is used to select a deployment pattern for distributing server applications. In the example of FIG. 18, the deployment type selection section 43 offers options titled "1VM,""Individual VM," "Web Only," and "EJB Only," where VM refers to Java virtual machine (VM).

Option "1VM" permits a single managed server computer to run all web server, servlet, and EJB functions with a single Java VM. Option "Individual VM" causes web server, servlet, and EJB functions to be deployed on different managed server computers and to run with individual Java VMs. Option "Web Only" is selected to solely run web server applications. Option "EJB Only" is selected to solely run EJB server applications.

The target selection section 44 is used to specify where to deploy server applications. Specifically, the target selection section 44 is formed from data field titled "web server connector," "servlet container," and "EJB container." The web server connector field is used to select a group of managed server computers on which web servers will be deployed. The servlet container field is used to select a group of managed server computers on which servlets (or application server) will be deployed. The EJB container field is used to select a group of managed server computers on which EJB (or database servers) will be deployed.

When a server group is selected at the target selection section 44, some information about managed server computers belonging to the selected server group will be displayed. The information includes, for example, the order (No.), server name, and IP address of each such managed server computer.

The inter-server relation selection section 45 is used to specify a desired connection topology of servers. Specifically, the user can select either mesh connection or line connection.

The CREATE button 46 is used to create a set of definition data describing a service according to the data items entered in the server definition dialog 40. Depression of this CREATE button 46 causes the server definition builder 121 to add to the server definition data 111 a new record created from the data entered in the server definition dialog 40.

The following part of the description will give more details of how the management server computer 100 deploys sever applications in the above-described system.

Figure 19:
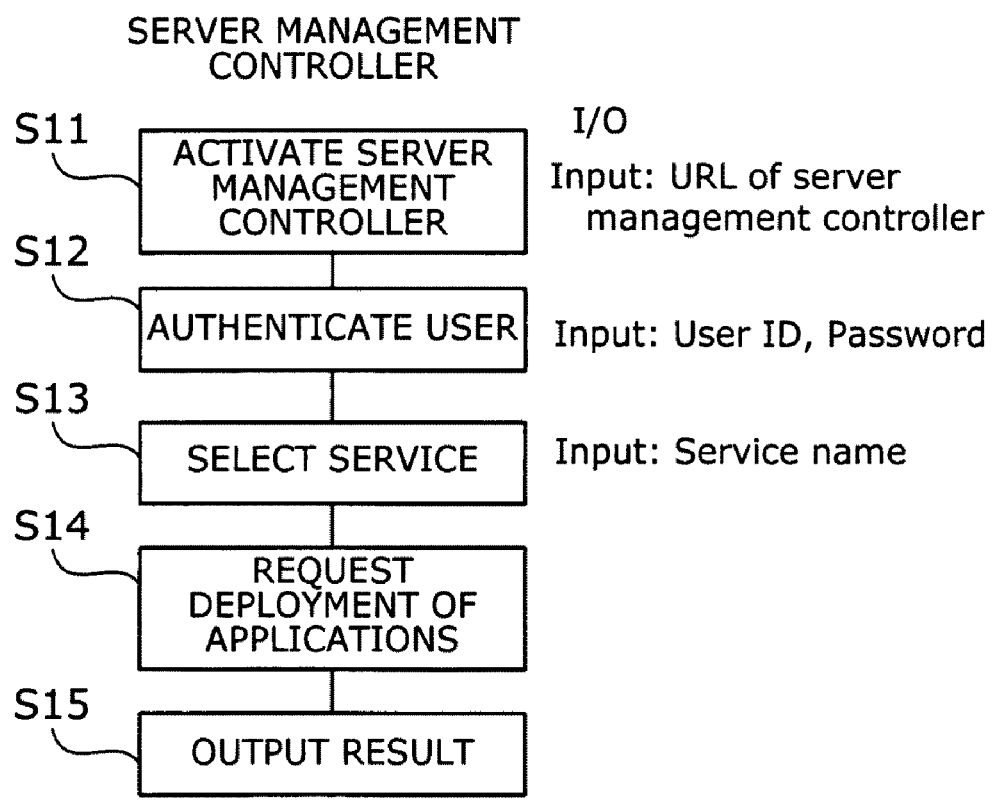
FIG. 19 shows a process that the management server computer executes.

FIG. 19 shows a process that the management server computer executes. The process of FIG. 19 will now be described according to the step numbers.

(Step S11) The management server computer 100 receives a service environment setup request from the management console terminal 21, the request specifying a uniform resource locator (URL) of the server management controller 122. Upon receipt of this request, the operating system of the management server computer 100 activates the server management controller 122.

(Step S12) The server management controller 122 receives a user ID and a password from the management console terminal 21, thus performing a user authentication based on the received information.

(Step S13) From the management console terminal 21 the server management controller 122 also receives a service name indicating a specific service that is going to be offered to client computers 310 and 320. The server management controller 122 selects the specified service as an object to be deployed.

(Step S14) The server management controller 122 calls up the deployment controller 123 to request deployment of necessary applications, passing the service name of the service selected at step S13. The deployment controller 123 deploys necessary applications accordingly (details described later), and the server management controller 122 receives the result of the deployment process as a return value from the deployment controller 123.

Note that the deployment request does not explicitly distinguish deployment of new applications from update of existing applications. The request will invoke an update process if the target platforms already have relevant applications installed earlier. If the target platforms have no such existing applications, the request will invoke a process of adding relevant applications to those computers.

(Step S15) The server management controller 122 outputs the result to the management console terminal 21.

The following part of the description will give more details of how the deployment controller 123 controls application deployment requested by the server management controller 122.

Figure 20:
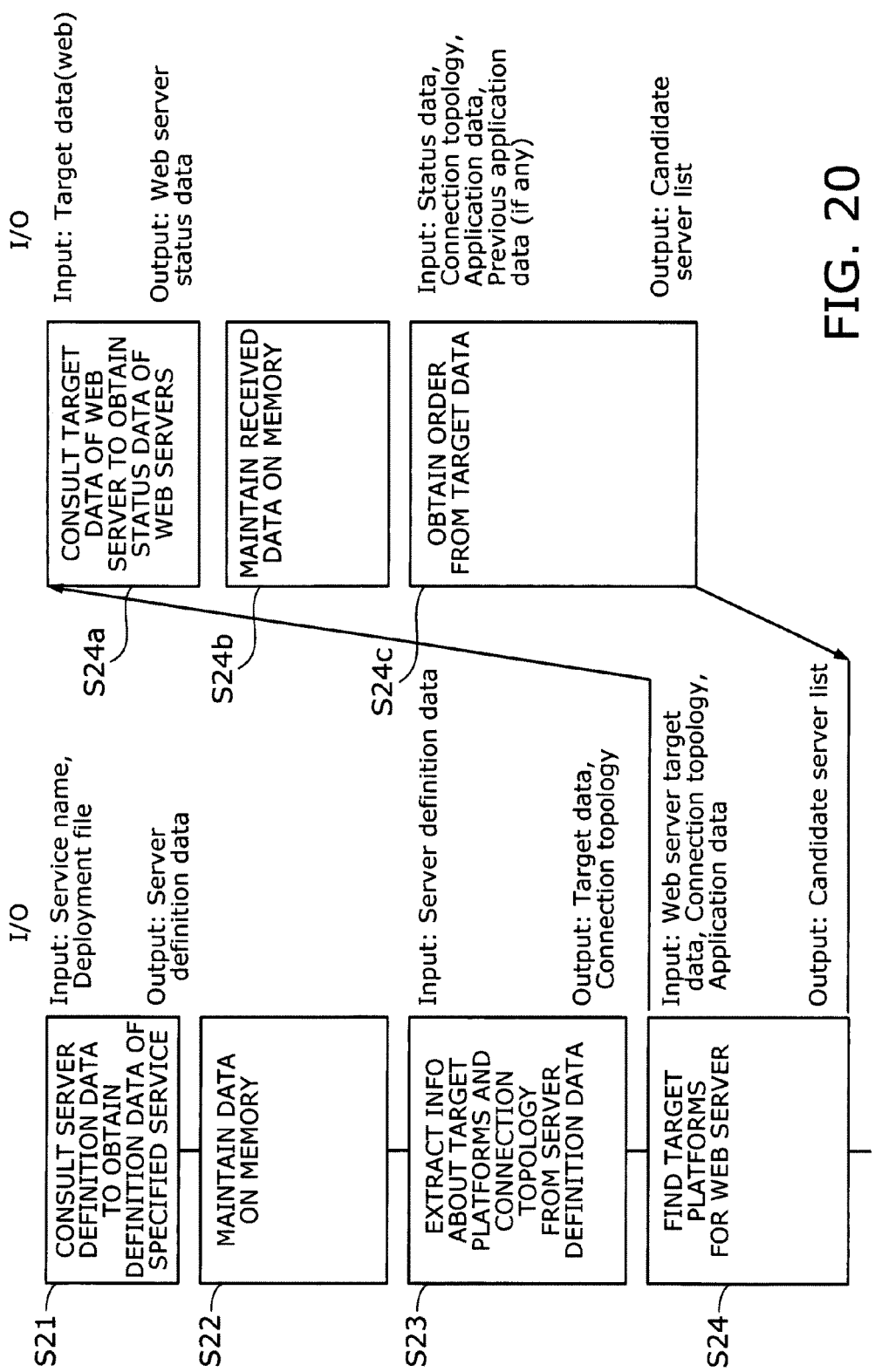
FIG. 20 shows a first half of a detailed process of deployment control.

FIG. 20 shows a first half of a detailed process of deployment control. The process of FIG. 20 will now be described according to the step numbers.

(Step S21) When an application deployment request specifying a service name is received from the server management controller 122, the deployment controller 123 retrieves a deployment file and application data corresponding to the specified service name. Then the deployment controller 123 consults the server definition data 111 to obtain definition data of the service corresponding to the service name.

(Step S22) The deployment controller 123 writes the obtained definition data into a memory (e.g., RAM 102) and maintains it on that memory.

(Step S23) The deployment controller 123 consults the target data set 112 to extract target data and connection topology information. The former includes target data 112a of web server, target data 112b of application server, and target data 112c of database server. The latter may be line connection or mesh connection.

(Step S24) Based on the target data of web server, connection topology, and application data, the deployment controller 123 determines target platforms for web server, thus producing a candidate server list. More specifically, this step includes the following substeps: S24a, S24b, and S24c.

(Step S24a) The deployment controller 123 consults the target data of web server, which is part of the target data set 112, to obtain the name of status data for the managed server computers listed as target platforms for web server. The deployment controller 123 then retrieves status data having that name from the status data set 113.

(Step S24b) The deployment controller 123 writes the obtained status data into a memory (e.g., RAM 102) and maintains it on that memory.

(Step S24c) The deployment controller 123 obtains an order value from the target data. Specifically, the deployment controller 123 compiles a candidate server list from the status data of step S24b, connection topology, and application data (and, if any, previous application data produced for each managed server computer in a previous application deployment). More specifically, the deployment controller 123 creates a candidate server list enumerating server computers listed in the target data, except for those having status data records that indicate unsuccessful deployment of applications in the past.

Each managed server computer on the list is given an order value. The smaller the order value, the higher priority the server computer will be given in a deployment process.

In the case where a managed server computer on the list has application data produced in a previous deployment process, the deployment controller 123 compares that previous application data with the current one. If they coincide with each other, then the deployment controller 123 determines that the application is up to date, and thus excludes the managed server computer of interest from the group of target platforms (i.e., removes its name from the candidate server list).

Figure 21:
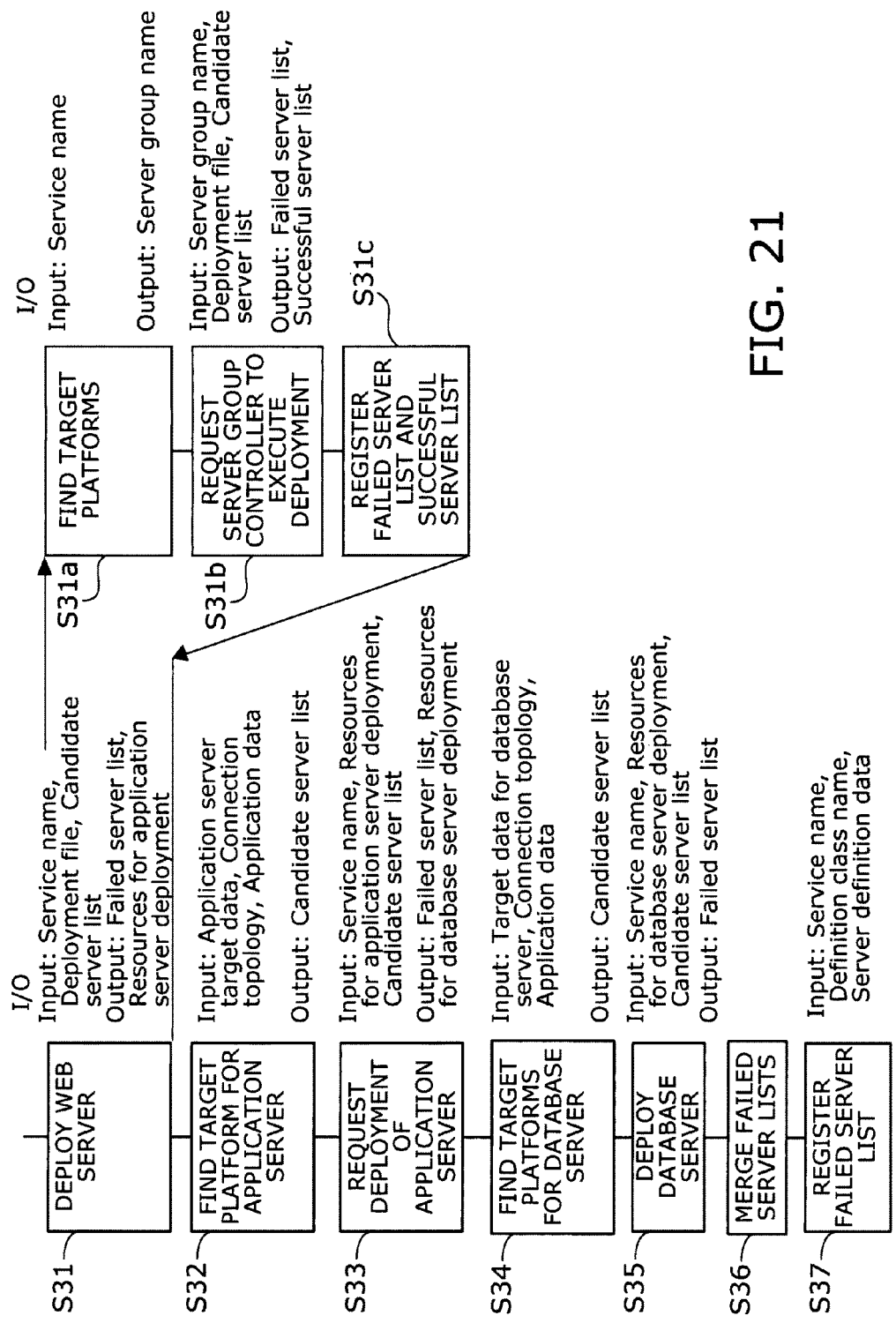
FIG. 21 shows a second half of the detailed process of deployment control.

FIG. 21 shows a second half of the detailed process of deployment control. The process of FIG. 21 will now be described according to the step numbers.

(Step S31) According to the given service name, deployment file, and candidate server list, the deployment controller 123 deploys web server functions on each server computer listed on the candidate server list. As outcomes of this deployment, the deployment controller 123 produces a failed server list and a set of resources for application server deployment. More specifically, this step includes the following substeps: S31a, S31b, and S31c.

(Step S31a) Based on the given service name, the deployment controller 123 identifies a web server group relevant to the requested service and obtains the name of that server group. The deployment controller 123 thus finds target platforms.

(Step S31b) The deployment controller 123 requests the server group controller 124 to deploy web server functions. Specifically, the deployment controller 123 passes a specific server group name, deployment file, and candidate server list to the server group controller 124, thus initiating a deployment process. The server group controller 124 provides the deployment controller 123 with a deployment result for each managed server computer, thus allowing the deployment controller 123 to produce a failed server list and a successful server list. The details of what the server group controller 124 does will be described later.

(Step S31c) The deployment controller 123 saves the failed server list and successful server list into the failed server list collection 115 and successful server list collection 118, respectively. Also the deployment controller 123 saves information about the deployed server applications into the application data set 119.

(Step S32) Based on the target data of application server, connection topology, and application data, the deployment controller 123 finds target platforms for application server, thus producing a candidate server list. The details of this step are similar to the case of web server deployment (see steps S24a, S24b, and S24c).

(Step S33) According to the given service name, resources for application server deployment, and candidate server list, the deployment controller 123 deploys application server functions on each server computer listed on the candidate server list. As outcomes of this deployment, the deployment controller 123 produces a failed server list and a set of resources for database server deployment. The details of this step are mostly similar to the case of web server deployment (see steps S31a, S31b, and S31c), except that the deployment process for application server can use the resources that the deployment controller 123 have produced earlier in deploying web server functions. This establishes an environment which enables the server applications on different managed server computers to work together.

(Step S34) Based on the target data for database server, connection topology, and application data, the deployment controller 123 finds target platforms for database server, thus producing a candidate server list. The details of this step are similar to the case of web server deployment (see steps S24a, S24b, and S24c).

(Step S35) According to the given service name, resources for database server deployment, and candidate server list, the deployment controller 123 deploys database server functions on each server computer listed on the candidate server list. The deployment controller 123 produces a failed server list as an outcome of this deployment. The details of this step are mostly similar to the case of web server deployment (see steps S31a, S31b, and S31c), except that the deployment process for database server can use the resources that the deployment controller 123 have produced earlier in deploying application server functions.

(Step S36) The deployment controller 123 merges all failed server lists created in the course of deploying each server application.

(Step S37) Based on the given service name, definition class name (i.e., the name of a class in which the server definition data 111 is defined), and server definition data, the deployment controller 123 enters the failed server list of step S36 into the failed server list collection 115 in association with the definition data.

Figure 22:
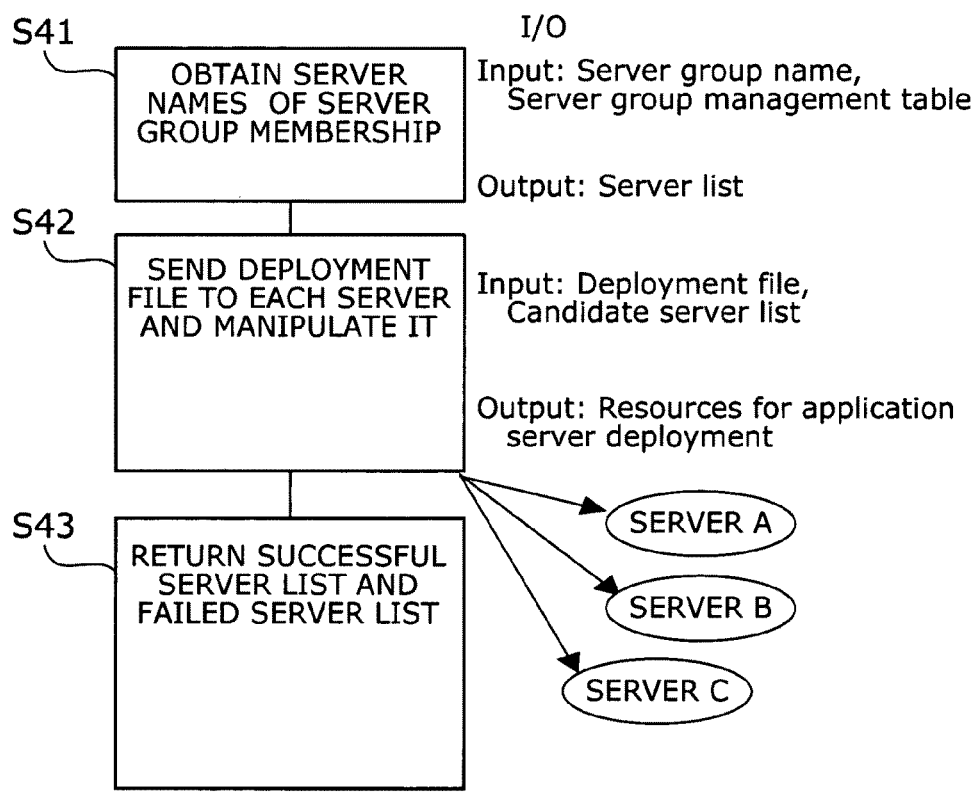
FIG. 22 gives details of how applications are distributed.

FIG. 22 gives details of how applications are distributed. The process of FIG. 22 will now be described according to the step numbers.

(Step S41) Based on a given server group name and server group management table 116, the server group controller 124 obtains a server list, i.e., a list of server names of server computers on which server applications have to be deployed.

(Step S42) The server group controller 124 deploys a deployment file of a server application to be deployed, to managed server computers. Specifically, the server group controller 124 selects the server name of each managed server computer successively from among those in the server list. The server group controller 124 then determines whether the selected server name is included in the candidate server list. If it is included, the server group controller 124 sends deployment data to the corresponding managed server computer. Subsequently, the server group controller 124 manipulates that managed server computer, thus setting up an operation environment for the intended server application on the basis of the deployment file that is sent thereto.

The managed server computers not named in the candidate server list will not receive deployment files and other things.

(Step S43) The managed server computers involved in the deployment of server applications return a response to indicate the result, which enables the server group controller 124 to determine whether the deployment has successfully finished. The server group controller 124 creates a failed server list and a successful server list and passes them to the deployment controller 123.

The present embodiment operates in the way described above, deploying applications across multiple-layered servers with a single series of actions. The present embodiment thus makes it easier to manage and operate the system.

Deployment operation may be abandoned if it is necessary to do so to keep the applications consistent across parallel servers. This prevents the application environment from being destroyed by introduction of inconsistency.

The present embodiment may be used to deploy J2EE applications to provide a service. It is possible in this case to organize a multi-layered system consisting of, for example, web server, servlet, and EJB server. Each of those layers (web server, servlet, EJB server) may be implemented on two or more servers running in parallel. The present embodiment can deploy necessary applications over those parallel servers all at once.

What is actually delivered depends on what application to deploy. For example, war files are delivered only to web server computers.

The above-described processing mechanisms are implemented on a computer system. The functions of a management server computer are encoded and provided in the form of computer programs, so that a computer system executes such programs to provide the intended functions. Those programs are stored in a computer-readable medium. Suitable computer-readable storage media include magnetic storage media, optical discs, magneto-optical storage media, and semiconductor memory devices. Magnetic storage media include hard disk drives (HDD), flexible disks (FD), and magnetic tapes. Optical disc media include digital versatile discs (DVD), DVD-RAM, compact disc read-only memory (CD-ROM), CD-Recordable (CD-R), and CD-Rewritable (CD-RW). Magneto-optical storage media include magneto-optical discs (MO).

Portable storage media, such as DVD and CD-ROM, are suitable for the distribution of program products. Network-based distribution of programs may also be possible, in which case program files are made available on a server computer for downloading to other computers via a network.

A computer stores a program in its local storage unit, which have previously been installed from a portable storage media or downloaded from a server computer. The computer executes the programs read out of its local storage unit, thereby performing the programmed functions. As an alternative way of program execution, the computer may execute programs, reading out program codes directly from a portable storage medium. Another alternative method is that the user computer dynamically downloads programs from a server computer when they are demanded and executes them upon delivery.

According to the present invention, the platforms for deployment data necessary to provide a service are determined on a server group basis in response to a request for establishing a service environment. The deployment data of each application is sent collectively to server computers belonging to the corresponding server group. This mechanism enables application resources on a multi-layered system to be updated with a single operation, thus preventing the applications from becoming inconsistent.

The foregoing is considered as illustrative only of the principles of the present invention. Further, since numerous modifications and changes will readily occur to those skilled in the art, it is not desired to limit the invention to the exact construction and applications shown and described, and accordingly, all suitable modifications and equivalents may be regarded as falling within the scope of the invention in the appended claims and their equivalents.

What is claimed is:

1. A computer-readable, non-transitory medium storing a program for managing applications in a system where a plurality of applications installed on different server computers work together to provide services, the program causing a computer to execute a process comprising:

identifying, in response to a request for establishing an environment for a service, first and second server computers belonging to different server groups corresponding to different functions necessary to provide the requested service;

selecting first and second application programs required to implement the functions for the requested service; and sending the first application program from the computer to the first server computer before sending the second application program from the computer to the second server computer, to set up an operation environment for each of the first and second application programs such that the first server computer sends processing requests to the second server computer.

2. A computer-readable, non-transitory medium according to claim 1, wherein the selecting selects a calling application program as the first application program and a called application program as the second application program, based on call relationships therebetween.

3. A computer-readable, non-transitory medium according to claim 2, wherein the process further comprises installing the called application program by using data that is produced as a result of the setting up of the operating environment for the calling application program.

4. A computer-readable, non-transitory medium according to claim 1, wherein the process further comprises maintaining records about whether each of the first and second server computers has successfully set up the operating environment, and inhibiting the first or second server computer from receiving new application programs when the record of said first or second server computer indicates unsuccessful setting up of the operating environment.

5. A method executed by a computer to manage applications in a system where a plurality of applications installed on different server computers work together to provide services, the method comprising:
    identifying, in response to a request for establishing an environment for a service, first and second server computers belonging to different server groups corresponding to different functions necessary to provide the requested service;
    selecting first and second application programs required to implement the functions for the requested service; and
    sending the first application program from the computer to the first server computer before sending the second application program from the computer to the second server computer, to set up an operation environment for each of the first and second application programs such that the first server computer sends processing requests to the second server computer.

6. An apparatus for managing applications in a system where a plurality of applications installed on different server computers work together to provide services, the apparatus comprising:
    a server management controller to identify, in response to a request for establishing an environment for a service, first and second server computers belonging to different server groups corresponding to different functions necessary to provide the requested service;
    a deployment controller that selects first and second application programs required to implement the functions for the requested service, and sends the first application program from the apparatus to the first server computer before sending the second application program from the apparatus to the second server computer, to set up an operation environment for each of the first and second application programs such that the first server computer sends processing requests to the second server computer.

7. A computer-readable, non-transitory medium storing a program that causes a computer to execute a process, said process comprising:
    receiving a request for deployment of application programs for a service; and
    sending, in response to the request, the application programs from said computer to both a first server computer and a second server computer, based on coupling relationship of the first and second server computers forming a multi-layered system for providing the service, in a sequential order in which the first server computer has priority over the second server computer, the first computer sending processing requests to the second computer in the multi-layered system.

* * * * *